United States Patent
Lampkin

(10) Patent No.: US 9,365,167 B1
(45) Date of Patent: Jun. 14, 2016

(54) SEAT DEVICE WITH AN INTEGRAL TOILET

(71) Applicant: Portia S. Lampkin, Sewell, NJ (US)

(72) Inventor: Portia S. Lampkin, Sewell, NJ (US)

(*) Notice: Subject to any disclaimer, the term of this patent is extended or adjusted under 35 U.S.C. 154(b) by 347 days.

(21) Appl. No.: 14/059,553

(22) Filed: Oct. 22, 2013

(51) Int. Cl.
*B60R 15/04* (2006.01)

(52) U.S. Cl.
CPC ..................... *B60R 15/04* (2013.01)

(58) Field of Classification Search
CPC ........................................ B60R 15/04
USPC ..................................... 4/458, 483
See application file for complete search history.

(56) References Cited

U.S. PATENT DOCUMENTS

| | | | |
|---|---|---|---|
| 4,296,506 A * | 10/1981 | Stoute, Sr. | A61G 5/1002 4/452 |
| 4,785,483 A | 11/1988 | Wise | |
| 5,359,737 A * | 11/1994 | Hodge | A47K 11/04 4/476 |
| D356,365 S | 3/1995 | Liao | |
| 5,564,136 A * | 10/1996 | Cox | A61G 5/1002 4/480 |
| 5,848,443 A | 12/1998 | Waugh | |
| 6,240,576 B1 | 6/2001 | Cosby | |
| 7,313,833 B2 * | 1/2008 | Wee | B60R 15/04 4/458 |
| 8,316,491 B2 * | 11/2012 | Hayes | A61G 7/02 5/604 |
| 2004/0158918 A1* | 8/2004 | Lopes | A47K 11/06 4/484 |
| 2006/0015995 A1 | 1/2006 | Toshikian | |

* cited by examiner

Primary Examiner — Huyen Le

(57) ABSTRACT

A seat device with an integral toilet permits a person to use a toilet while seated in a vehicle. The device includes a seat having a top side, a bottom side, and a perimeter wall attached to and extending between the top side and the bottom side. A slot extends into the top side of the seat. The slot has a bottom wall and an outer wall attached to and extending upwardly from the bottom wall. The bottom wall and the outer wall define an interior space of the slot. A liner is removably positioned within the slot.

11 Claims, 5 Drawing Sheets

SEAT DEVICE WITH AN INTEGRAL TOILET

BACKGROUND OF THE DISCLOSURE

Field of the Disclosure

The disclosure relates to seat devices and more particularly pertains to a new seat device for permitting a person to use a toilet while seated in a vehicle.

SUMMARY OF THE DISCLOSURE

An embodiment of the disclosure meets the needs presented above by generally comprising a seat having a top side, a bottom side, and a perimeter wall attached to and extending between the top side and the bottom side. A slot extends into the top side of the seat. The slot has a bottom wall and an outer wall attached to and extending upwardly from the bottom wall. The bottom wall and the outer wall define an interior space of the slot. A liner is removably positioned within the slot.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
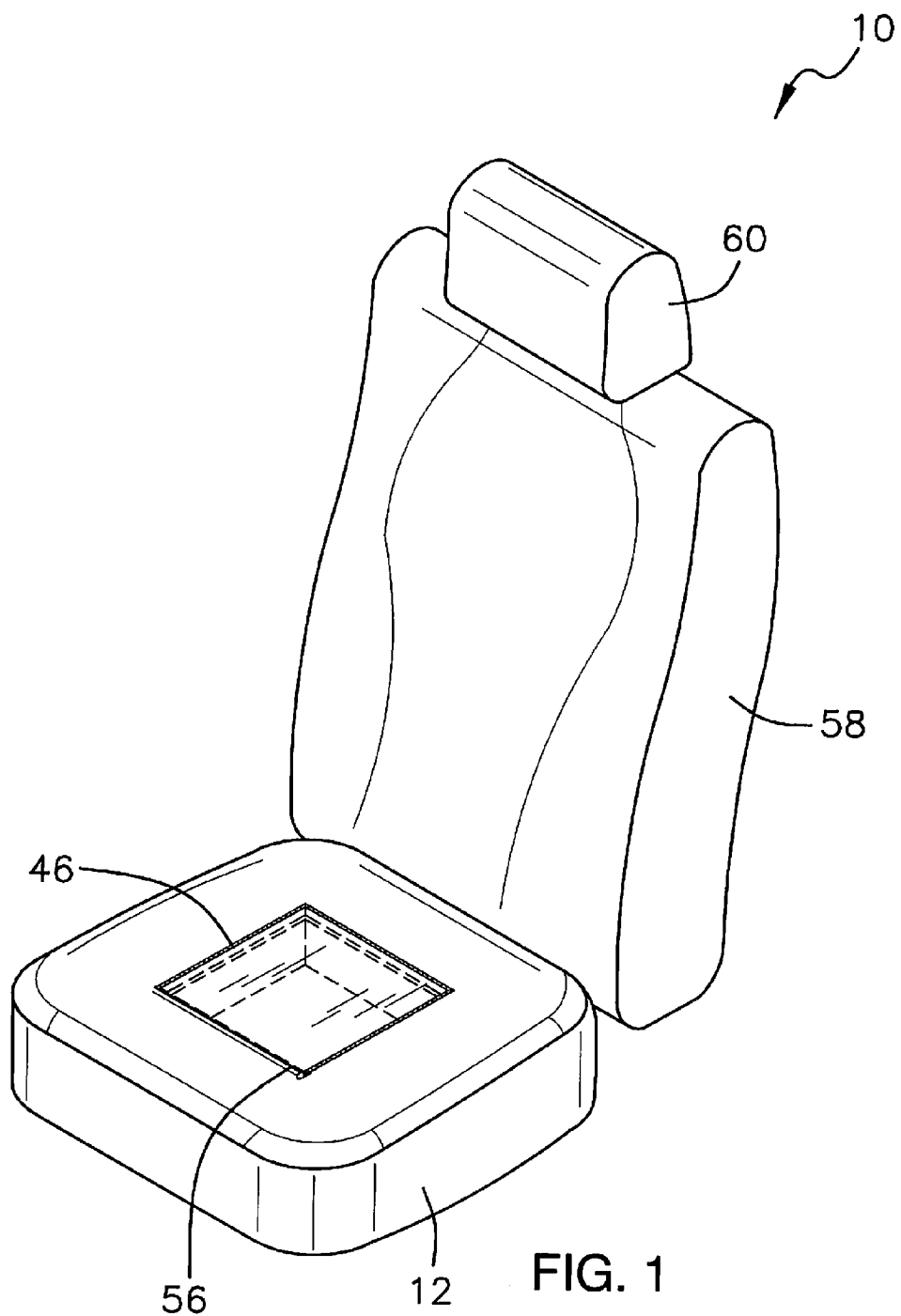
FIG. 1 is a top front side perspective view of a seat device with an integral toilet according to an embodiment of the disclosure.
Figure 2:
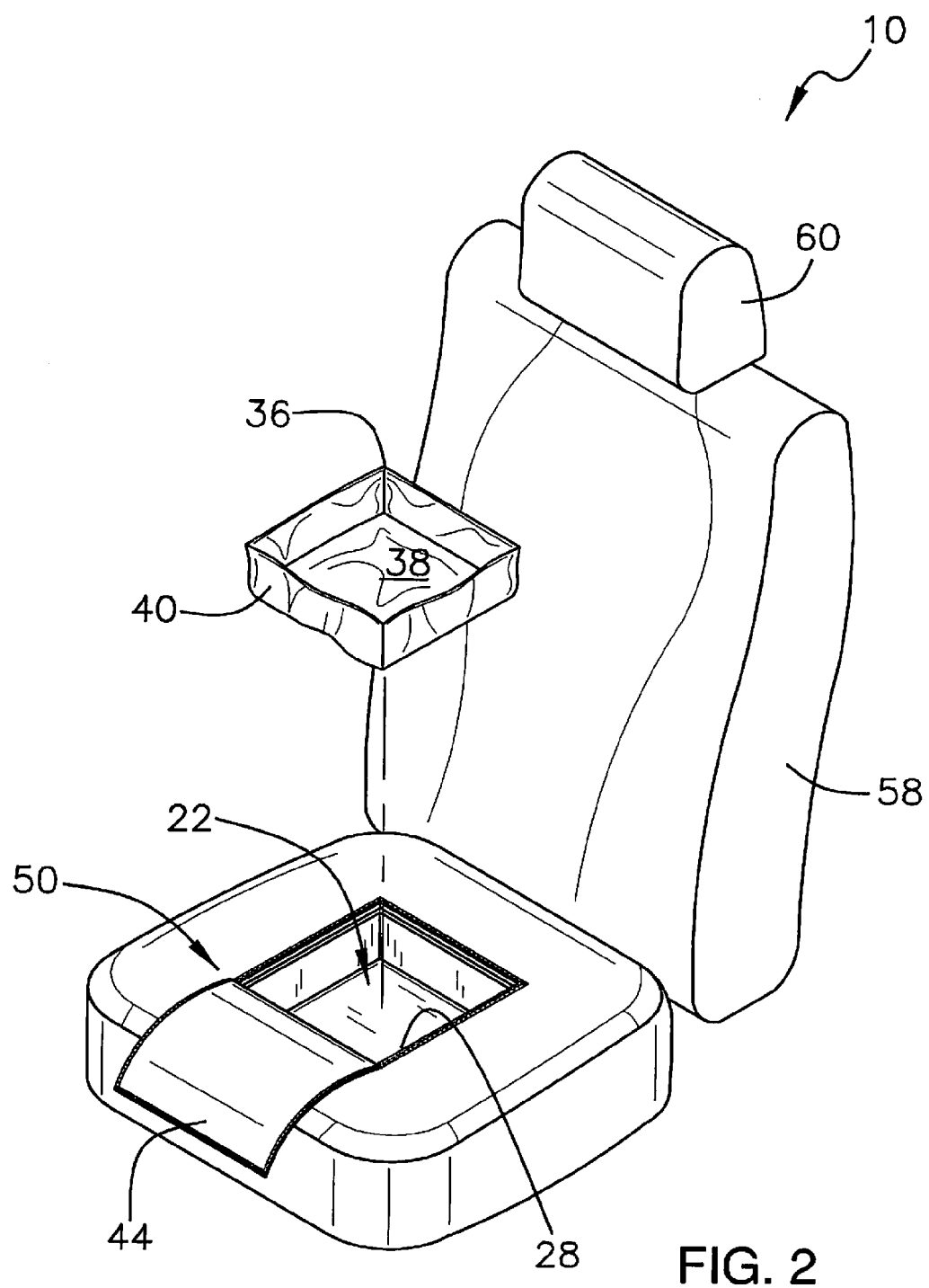
FIG. 2 is a partially-exploded top front side perspective view of an embodiment of the disclosure.
Figure 3:
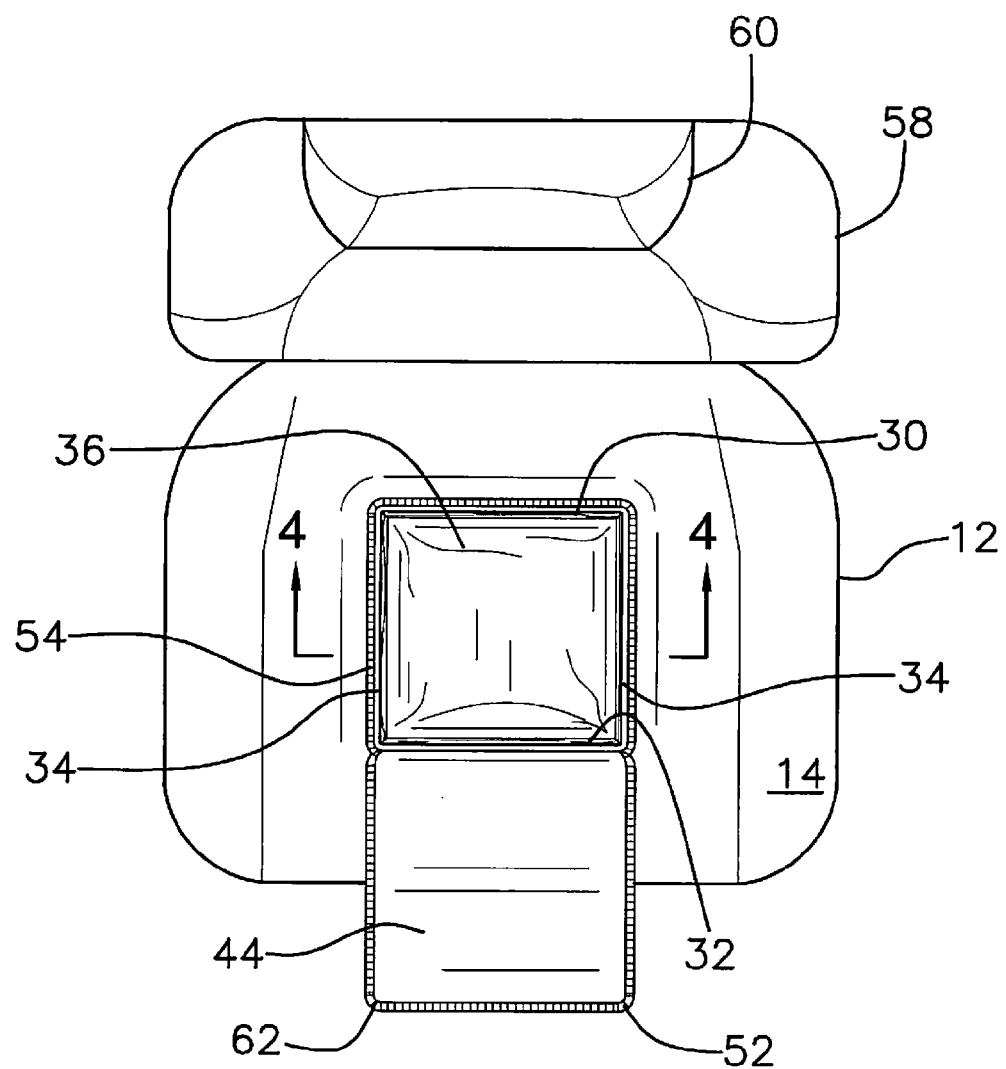
FIG. 3 is a top view of an embodiment of the disclosure.
Figure 4:
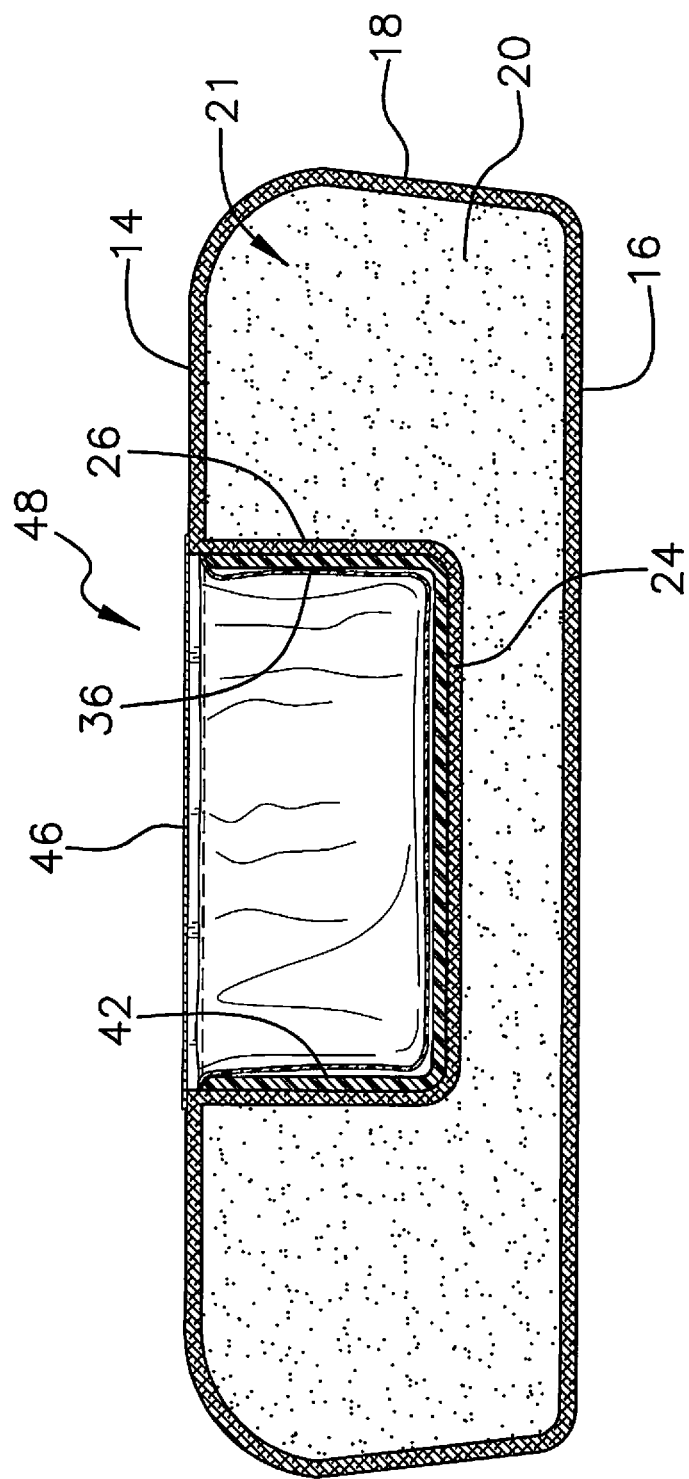
FIG. 4 is a cross-sectional view of an embodiment of the disclosure taken along line 4-4 of FIG. 3.
Figure 5:
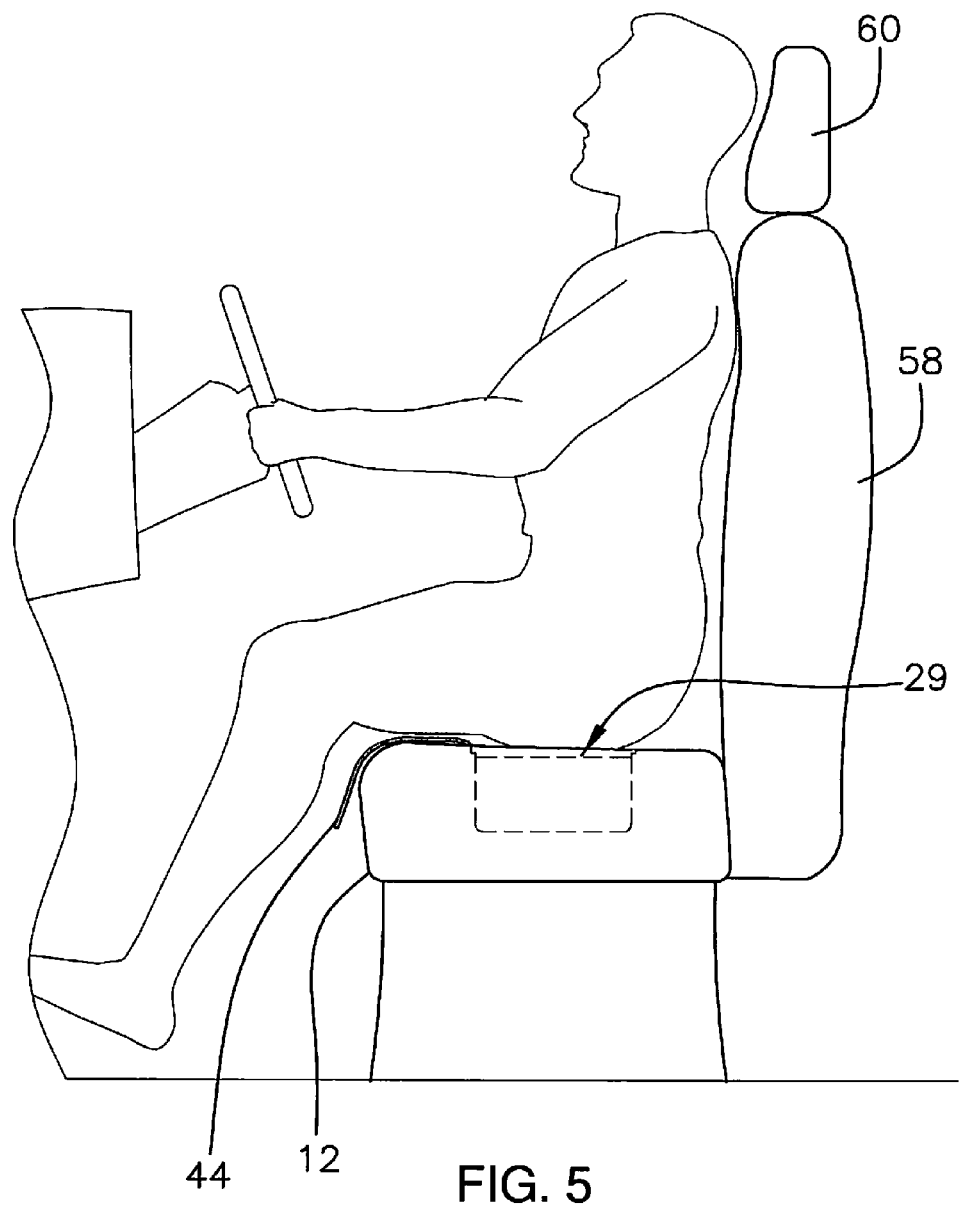
FIG. 5 is an in-use side view of an embodiment of the disclosure.

With reference now to the drawings, and in particular to FIGS. 1 through 5 thereof, a new seat device embodying the principles and concepts of an embodiment of the disclosure and generally designated by the reference numeral 10 will be described.

As best illustrated in FIGS. 1 through 5, the seat device with an integral toilet 10 generally comprises a seat 12 having a top side 14, a bottom side 16, and a perimeter wall 18 attached to and extending between the top side 14 and the bottom side 16. A cushion 20 may be positioned in an interior 21 of the seat 12. The seat 12 may comprise a conventional automobile seat and include a back rest 58 and a head rest 60.

A slot 22 extends into the top side 14 of the seat 12. The slot 22 has a bottom wall 24 and an outer wall 26 attached to and extending upwardly from the bottom wall 24. The bottom wall 24 and the outer wall 26 define an interior space 29 of the slot 22. The outer wall 26 has an upper edge 28 defining an access opening into the interior space 29 of the slot 22. The upper edge 28 includes a front section 30, a back section 32, and a pair of lateral sections 34 extending between the front 30 and back 32 sections. The slot 22 may have a height between approximately 5.0 centimeters and 10.0 centimeters, a length between approximately 15.0 centimeters and 21.0 centimeters, and a width between approximately 17.0 centimeters and 22.0 centimeters.

A liner 36 is removably positioned within the slot 22. The liner 36 is unattached to the container 12. The liner 36 has a lower wall 38 and a peripheral wall 40 attached to and extending upwardly from the lower wall 38. The lower wall 38 may be spaced from the bottom side 16 of the seat 12. The lower wall 38 may be positioned nearer the bottom side 16 than the top side 14 of the seat 12. The lower wall 38 has a size and shape to abut and cover the bottom wall 24 such that the outer wall 26 abuts and is coextensive with an inner surface 42 of the slot 22. The liner 36 is comprised of a plastic or elastomer and is at least semi-rigid so that it generally holds its shape. The liner 36 may be scented.

A flap 44 may be coupled to the seat 12. The flap 44 may be coupled to the back section 32 of the upper edge 28 of the slot 22. A closure 46 attaches the flap 44 to an entirety of the upper edge 28 of the slot 22. The closure 46 is actuated to a closed state 48 to close the access opening or to an opened state 50 allowing access to the interior space 29 of the slot 22. The closure 46 may comprise a zipper having a plurality of flap teeth 52, a plurality of seat teeth 54, and a slide member 56 selectively coupling the seat teeth 54 and the flap teeth 52. The flap teeth 52 are coupled to and extend around the flap 44 proximate an outer perimeter 62 of the flap 44. The seat teeth 54 are coupled to the seat 12 and may extend around the front section 30 and the lateral sections 34 of the upper edge 28 of the slot 22. The flap teeth 52 are complementarily positioned relative to the seat teeth 54. The slide member 56 is slidable to selectively interlock the flap teeth 52 and the seat teeth 54 whereby the slide member 56 selectively opens and closes the access opening. Alternatively, the closure 46 may comprise snaps, complementary portions of a hook and loop fastener, or the like.

In use, as stated above and shown in the Figures, a user positions the liner 36 in the slot 22. The user sits in the seat 12 and unfastens the flap 44 to expose the access opening when having to urinate. The user then urinates into the liner 36 and subsequently uses the closure 46 to close the access opening. After reaching a destination, the user removes and disposes of the liner 36. A new liner 36 is then repositioned within the slot 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A seat device with an integral toilet comprising:
   a seat having a top side, a bottom side, and a perimeter wall attached to and extending between said top side and said bottom side;
   a back rest coupled to said seat;
   a slot extending into said top side of said seat, said slot having a bottom wall and an outer wall attached to and extending upwardly from said bottom wall, said bottom wall and said outer wall defining an interior space of said slot, said outer wall having an upper edge defining an access opening into said interior space of said slot, said upper edge of said slot includes a front section, a back section, and a pair of lateral sections extending between said front and back sections, said front section being positioned proximate said back rest and said back section being positioned proximate a distal edge of said seat relative to said back rest;
   a liner removably positioned within said slot; and
   a flap coupled to said seat, said flap being coupled to said back section of said upper edge of said slot wherein said flap is foldable over said distal edge of said seat relative to said back rest whereby said access opening into said interior space of said slot is exposed.

2. The device of claim 1, further comprising a cushion positioned in an interior of said seat.

3. The device of claim 1, further comprising said liner having a lower wall and a peripheral wall being attached to and extending upwardly from said lower wall.

4. The device of claim 3, further comprising said lower wall being spaced from said bottom side of said seat.

5. The device of claim 3, further comprising said lower wall being positioned nearer said bottom side than said top side of said seat.

6. The device of claim 3, further comprising said lower wall having a size and shape to abut and cover said bottom wall such that said outer wall abuts and is coextensive with an inner surface of said slot.

7. The device of claim 1, further comprising said liner being scented.

8. The device of claim 1, further comprising a closure attaching said flap to an entirety of said upper edge of said slot, said closure being actuated to a closed state to close said access opening or to an opened state allowing access to said interior space of said slot.

9. The device of claim 8, further comprising said closure including:
   a plurality of flap teeth coupled to and extending around said flap proximate an outer perimeter of said flap;
   a plurality of seat teeth coupled to said seat, said seat teeth extending around a front section and a pair of lateral sections of said upper edge of said slot, said flap teeth being complementarily positioned relative to said seat teeth; and
   a slide member selectively coupling said seat teeth and said flap teeth, said slide member being slidable to selectively interlock said flap teeth and said seat teeth whereby said slide member selectively opens and closes said access opening.

10. The device of claim 8, further comprising said closure comprising complementary portions of a hook and loop fastener.

11. A seat device with an integral toilet comprising:
   a seat having a top side, a bottom side, and a perimeter wall attached to and extending between said top side and said bottom side;
   a back rest coupled to said seat;
   a cushion positioned in an interior of said seat;
   a slot extending into said top side of said seat, said slot having a bottom wall and an outer wall attached to and extending upwardly from said bottom wall, said bottom wall and said outer wall defining an interior space of said slot, said outer wall having an upper edge defining an access opening into said interior space of said slot, said upper edge including a front section, a back section, and a pair of lateral sections extending between said front and back sections, said front section being positioned proximate said back rest and said back section being positioned proximate a distal edge of said seat relative to said back rest;
   a liner removably positioned within said slot, said liner being unattached to said seat, said liner having a lower wall and a peripheral wall being attached to and extending upwardly from said lower wall, said lower wall being spaced from said bottom side of said seat, said lower wall being positioned nearer said bottom side than said top side of said seat, said lower wall having a size and shape to abut and cover said bottom wall such that said outer wall abuts and is coextensive with an inner surface of said slot, said liner being scented;
   a flap coupled to said seat, said flap being coupled to said back section of said upper edge of said slot wherein said flap is foldable over said distal edge of said seat relative to said back rest whereby said access opening into said interior space of said slot is exposed; and
   a closure attaching said flap to an entirety of said upper edge of said slot, said closure being actuated to a closed state to close said access opening or to an opened state allowing access to said interior space of said slot, said closure comprising
      a plurality of flap teeth coupled to and extending around said flap proximate an outer perimeter of said flap,
      a plurality of seat teeth coupled to and extending around said front section and said lateral sections of said upper edge of said slot, said flap teeth being complementarily positioned relative to said seat teeth, and
      a slide member selectively coupling said seat teeth and said flap teeth, said slide member being slidable to selectively interlock said flap teeth and said seat teeth whereby said slide member selectively opens and closes said access opening.

* * * * *